United States Patent
Malina et al.

(10) Patent No.: US 10,761,777 B2
(45) Date of Patent: *Sep. 1, 2020

(54) TIERED STORAGE USING STORAGE CLASS MEMORY

(71) Applicant: Western Digital Technologies, Inc., San Jose, CA (US)

(72) Inventors: James N. Malina, Irvine, CA (US); Albert H. Chen, Redmond, WA (US); Takeaki Kato, Bellevue, WA (US)

(73) Assignee: Western Digital Technologies, Inc., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/176,997

(22) Filed: Oct. 31, 2018

(65) Prior Publication Data

US 2019/0065121 A1  Feb. 28, 2019

Related U.S. Application Data

(62) Division of application No. 14/968,278, filed on Dec. 14, 2015, now Pat. No. 10,126,981.

(51) Int. Cl.
*G06F 3/06* (2006.01)

(52) U.S. Cl.
CPC ............ *G06F 3/0659* (2013.01); *G06F 3/068* (2013.01); *G06F 3/0613* (2013.01);
(Continued)

(58) Field of Classification Search
CPC ...... G06F 3/0659; G06F 3/068; G06F 3/0616; G06F 3/0613; G06F 3/0625; G06F 3/0647; G06F 3/0685
See application file for complete search history.

(56) References Cited

U.S. PATENT DOCUMENTS 4,420,807 A * 12/1983 Nolta ................. G11B 20/1883
                                                365/200
5,608,876 A    3/1997 Cohen et al.
(Continued)

FOREIGN PATENT DOCUMENTS

WO      2012134641 A2    10/2012

OTHER PUBLICATIONS

Phil Mills, "Storage Class Memory—the Future of Solid State Storage," http://www.snia.org/sites/default/education/tutorials/2009/fall/solid/PhilMills_The_Future_of_Solid_State_Storage_pdf., SNIA Education, 2009.

(Continued)

*Primary Examiner* — Hiep T Nguyen
(74) *Attorney, Agent, or Firm* — Barry IP Law, P.C.

(57) ABSTRACT

A Data Storage Device (DSD) includes a first memory for storing data and a Storage Class Memory (SCM) for storing data. The SCM has at least one characteristic of being faster than the first memory in storing data, using less power to store data than the first memory, and providing a greater usable life than the first memory for repeatedly storing data in a same memory location. At least a portion of the SCM is allocated or reserved for use by a host, and logical addresses assigned to the SCM are mapped to device addresses of the first memory identifying locations for storing data in the first memory. The host is provided with an indication of the logical addresses assigned to the SCM to allow the host to retrieve data from and store data in the DSD or to directly access data using the logical addresses assigned to the SCM.

22 Claims, 7 Drawing Sheets

(52) U.S. Cl.
CPC .......... *G06F 3/0616* (2013.01); *G06F 3/0625* (2013.01); *G06F 3/0647* (2013.01); *G06F 3/0685* (2013.01)

(56) References Cited

U.S. PATENT DOCUMENTS

| | | | |
|---|---|---|---|
| 6,856,556 B1 | 2/2005 | Hajeck | |
| 7,023,726 B1* | 4/2006 | Chen | G11C 11/15 |
| | | | 365/158 |
| 7,126,857 B2 | 10/2006 | Hajeck | |
| 7,216,211 B2 | 5/2007 | Munguia et al. | |
| 7,386,655 B2 | 6/2008 | Gorobets et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,904,619 B2 | 3/2011 | Danilak | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 7,979,601 B2 | 7/2011 | Berenbaum et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | DeForest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,631,191 B2 | 1/2014 | Hashimoto | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,392 B1 | 5/2014 | Asnaashari et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 8,903,995 B1* | 12/2014 | Basak | H04L 43/08 |
| | | | 709/224 |
| 8,947,803 B1* | 2/2015 | Yamakawa | G11B 27/36 |
| | | | 360/31 |
| 9,116,800 B2 | 8/2015 | Post et al. | |
| 9,189,387 B1 | 11/2015 | Taylor et al. | |
| 9,342,453 B2 | 5/2016 | Nale et al. | |
| 9,619,174 B2 | 4/2017 | Chen et al. | |
| 9,836,404 B2 | 12/2017 | Ummadi et al. | |
| 9,857,995 B1 | 1/2018 | Malina et al. | |
| 10,126,981 B1* | 11/2018 | Malina | G06F 3/0659 |
| 2010/0037002 A1 | 2/2010 | Bennett | |
| 2010/0174849 A1 | 7/2010 | Walston et al. | |
| 2010/0250793 A1 | 9/2010 | Syu | |
| 2011/0099323 A1 | 4/2011 | Syu | |
| 2011/0283049 A1 | 11/2011 | Kang et al. | |
| 2012/0166891 A1* | 6/2012 | Dahlen | G06F 12/0893 |
| | | | 714/54 |
| 2012/0210068 A1 | 8/2012 | Joshi et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2012/0331016 A1* | 12/2012 | Janson | G06F 16/25 |
| | | | 707/809 |
| 2013/0080687 A1 | 3/2013 | Nemazie et al. | |
| 2013/0091321 A1 | 4/2013 | Nishtala et al. | |
| 2013/0132638 A1 | 5/2013 | Horn et al. | |
| 2013/0145106 A1 | 6/2013 | Kan | |
| 2013/0290793 A1 | 10/2013 | Booth et al. | |
| 2014/0059405 A1 | 2/2014 | Syu et al. | |
| 2014/0101369 A1 | 4/2014 | Tomlin et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0149826 A1 | 5/2014 | Lu et al. | |
| 2014/0157078 A1 | 6/2014 | Danilak et al. | |
| 2014/0181432 A1 | 6/2014 | Horn | |
| 2014/0223255 A1 | 8/2014 | Lu et al. | |
| 2014/0351515 A1 | 11/2014 | Chiu et al. | |
| 2015/0058534 A1* | 2/2015 | Lin | G06F 3/0656 |
| | | | 711/103 |
| 2015/0142996 A1 | 5/2015 | Lu | |
| 2015/0302903 A1 | 10/2015 | Chaurasia et al. | |
| 2015/0363320 A1 | 12/2015 | Kumar et al. | |
| 2016/0027481 A1 | 1/2016 | Hong | |
| 2016/0118130 A1 | 4/2016 | Chadha et al. | |
| 2016/0313943 A1 | 10/2016 | Hashimoto et al. | |
| 2016/0342357 A1* | 11/2016 | Ramamoorthy | G06F 12/0868 |
| 2016/0357463 A1* | 12/2016 | DeNeui | G06F 3/0619 |
| 2017/0024332 A1 | 1/2017 | Rui et al. | |
| 2017/0147499 A1 | 5/2017 | Mohan et al. | |
| 2017/0160987 A1 | 6/2017 | Royer, Jr. et al. | |

OTHER PUBLICATIONS

Pending U.S. Appl. No. 16/683,095, filed Nov. 13, 2019, entitled "Storage Class Memory Access", Manzanares et al.

Kang et al.; "Subpage-based Flash Translation Layer for Solid State Drivers"; Jan. 2006; 10 pages; available at: https://cs.kaist.ac.kr/fileDownload?kind=tech&sn=340.

(56) References Cited

OTHER PUBLICATIONS

Kim et al.; "Partial Page Buffering for Consumer Devices with Flash Storage"; Proceedings 2013 IEEE 3rd International Conference on Consumer Electronics—Berlin, ICCE-Berlin 2013 (pp. 177-180); available at: https://hanyang.elsevierpure.com/en/publications/partial-page-buffering-for-consumer-devices-with-flash-storage.

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.

Xia et al.; "Edelta: A Word-Enlarging Based Fast Delta Compression Approach"; Jul. 2015; 5 pages; available at: https://www.usenix.org/system/files/conference/hotstorage15/hotstorage15-xia.pdf.

Pending U.S. Appl. No. 16/196,077, filed Nov. 20, 2018, entitled "Data Access in Data Storage Device Including Storage Class Memory", Dubeyko et al.

Pending U.S. Appl. No. 16/867,793, filed May 6, 2020, entitled "Page Modification Encoding and Caching", Cassuto et al.

Pending U.S. Appl. No. 16/246,401, filed Jan. 11, 2019, entitled "Fine Granularity Translation Layer for Data Storage Devices", Sanjay Subbarao.

Pending U.S. Appl. No. 16/246,425, filed Jan. 11, 2019, entitled "Container Key Value Store for Data Storage Devices", Sanjay Subbarao.

\* cited by examiner

TIERED STORAGE USING STORAGE CLASS MEMORY

CROSS-REFERENCE TO RELATED APPLICATION

This application is a divisional application of U.S. patent application Ser. No. 14/968,278, entitled "TIERED STORAGE USING STORAGE CLASS MEMORY", filed on Dec. 14, 2015, the entire contents of which are hereby incorporated by reference.

BACKGROUND

Data Storage Devices (DSDs) are often used to record data onto or to reproduce data from a storage media such as a rotating magnetic disk or a solid-state memory. New types of storage media, referred to as Storage Class Media (SCM), can provide various benefits over more conventional storage media, such as a rotating magnetic disk or flash memory. SCM can include, for example, a Magnetoresistive Random Access Memory (MRAM), a Phase Change Memory (PCM), a Resistive RAM (RRAM), Ferroelectric RAM (FeRAM), Programmable Metallization Cell RAM (PMC-RAM), Chalcogenide RAM (C-RAM), Ovonic Unified Memory (OUM), or a 3D XPoint memory.

Some DSDs may include different types of storage media in the same DSD, with each type of storage media having different advantages or disadvantages. SCM is typically faster than conventional storage media in storing data, may use less power, or provide a longer usable life for storing data. However, the amount of SCM storage space may be limited, since SCM generally costs more than conventional storage media.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
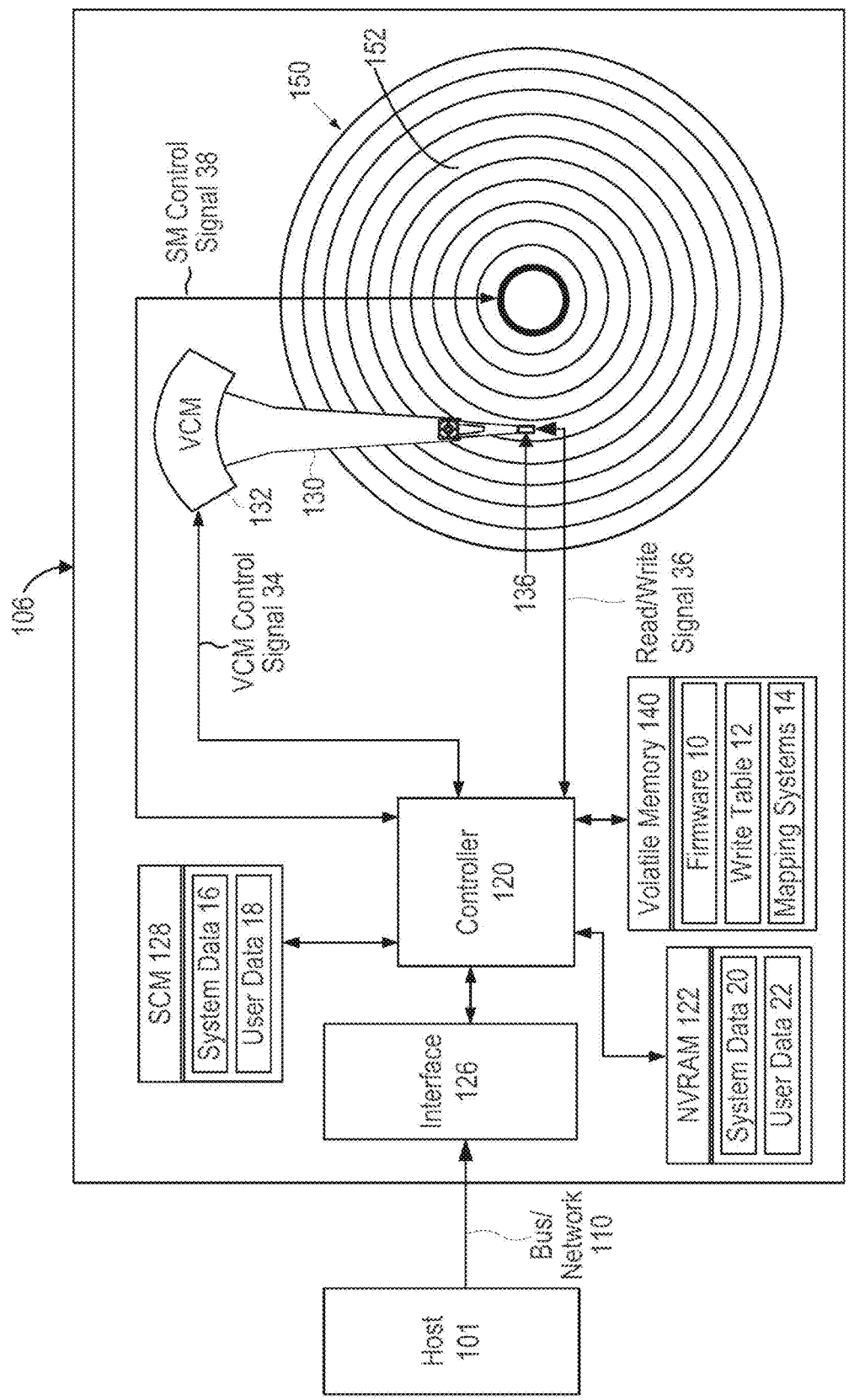
FIG. 1 is a block diagram depicting a Data Storage Device (DSD) according to an embodiment.

FIG. 1 shows an example of Data Storage Device (DSD) 106 which communicates with host 101 according to an embodiment. Host 101 and DSD 106 may form a system, such as a computer system (e.g., server, desktop, mobile/laptop, tablet, smartphone, etc.) or other electronic device such as a Digital Video Recorder (DVR). The components of FIG. 1 may or may not be physically co-located. In this regard, host 101 may be located remotely from DSD 106.

Those of ordinary skill in the art will appreciate that other embodiments can include more or less than those elements shown in FIG. 1 and that the disclosed processes can be implemented in other environments. For example, other embodiments can include a different number of hosts communicating with DSD 106.

As shown in FIG. 1, DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Host interface 126 is configured to interface DSD 106 with host 101 via bus/network 110, and may interface using, for example, Ethernet or WiFi, or a bus standard such as Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120.

As shown in the example embodiment of FIG. 1, DSD 106 includes Non-Volatile Random Access Memory (NVRAM) 122 and Storage Class Memory (SCM) 128 for non-volatilely storing data across power cycles. SCM 128 has at least one characteristic of being faster than NVRAM 122 in storing data, using less power to store data than NVRAM 122, and providing a greater usable life than NVRAM 122 for repeatedly storing data in the same memory location. SCM 128 can include, for example, a Magnetoresistive Random Access Memory (MRAM), a Phase Change Memory (PCM), a Resistive RAM (RRAM), Ferroelectric RAM (FeRAM), Programmable Metallization Cell RAM (PMC-RAM or PMCm), Chalcogenide RAM (C-RAM), Ovonic Unified Memory (OUM), Non-Volatile Dual In-Line Memory Module-P (NVDIMM-P), or a 3D XPoint memory.

Although SCM 128 can include one or more advantages over NVRAM 122, the space available for storing data in SCM 128 may be limited as compared to the space available in NVRAM 122 or disk 150 due to a higher cost in providing SCM 128. In some implementations, the storage capacity of NVRAM 122 or disk 150 can be several hundred times or several thousand times the size of SCM 128.

In the example of FIG. 1, SCM 128 stores system data 16 and user data 18. System data includes data that is used by controller 120 for operating DSD 106. Such system data may be loaded from SCM 128 into volatile memory 140 as needed during operation of DSD 106. User data 18 includes data that has been received from host 101 for storage in DSD 106.

As discussed in more detail below, SCM 128 can be used to store user data from host 101 for addresses that have been written more often to make better use of the advantages of SCM 128. SCM 128 can also be used to perform higher priority write commands that can result in a greater benefit by being quickly completed in SCM 128.

In addition, SCM 128 can be used to store user data that may not otherwise fit into a smallest writable unit of NVRAM 122 or disk 150 (e.g., non-aligned writes or runt data). In the case of disk 150, SCM 128 can be used to store data that is smaller than a sector size on disk 150 (e.g., smaller than a 512 byte sector or 4 KB sector). In the case of NVRAM 122, SCM 128 can be used to store data that is smaller than a page size of NVRAM 122 (e.g., smaller than a 512 byte page or 4 KB page). This smaller data can stay in SCM 128 or can later be migrated to disk 150 or NVRAM 122 after being grouped with other data to form a full sector or page size. The smaller size of this data can also allow for the space of SCM 128 to be used more effectively.

The system data stored in SCM 128 can also be limited based on certain criteria to conserve space in SCM 128. In some implementations, the system data stored in SCM 128 can be limited to system data that is accessed more than a threshold frequency for reading or writing, smaller than a threshold size, and/or used during or soon after a startup period of DSD 106. Examples of such smaller or more frequently accessed system data can include write pointers for NVRAM 122 or disk 150 (e.g., in Shingled Magnetic Recording (SMR) zoned storage applications), timestamps of when data was accessed, or frequently updated information about zones of storage in NVRAM 122 or disk 150, such as which zone is open or the number of open zones in an SMR zoned storage application. By storing system data in SCM 128 that is more frequently accessed, the faster access, lower power, and/or greater endurance of SCM 128 can be taken advantage of more often. Limiting the size of the system data stored in SCM 128 can help in saving space in SCM 128 and allow for a wider range of different data sets to be stored in SCM 128.

In addition to system data that is smaller or more frequently accessed, SCM 128 can be used to store system data that is accessed during or soon after a startup period of DSD 106. Storing this type of system data can ordinarily allow for a quicker resume time for DSD 106 during a startup period.

In the example of FIG. 1, NVRAM 122 can include a more conventional memory than SCM 128, such as flash integrated circuits, NAND memory (e.g., single-level cell (SLC) memory, multi-level cell (MLC) memory, or any combination thereof), or NOR memory. As shown in FIG. 1, NVRAM 122 can also store system data 20 and user data 22.

DSD 106 includes additional non-volatile memory with disk 150. In other embodiments, DSD 106 may not include disk 150 and may instead use NVRAM 122 or SCM 128 for non-volatilely storing data that would otherwise have been stored in disk 150.

In the example of FIG. 1, disk 150 is rotated by a spindle motor (not shown). DSD 106 also includes head 136 connected to the distal end of actuator 130, which is rotated by Voice Coil Motor (VCM) 132 to position head 136 in relation to disk 150. Controller 120 can control the position of head 136 and the rotation of disk 150 using VCM control signal 34 and SM control signal 38, respectively. In this regard, controller 120 includes servo controller circuitry for controlling the position of head 136 and the rotation of disk 150.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks 152 for storing data on a surface of disk 150. Tracks 152 on disk 150 may be grouped together into zones of tracks with each track divided into a number of sectors that are spaced circumferentially along the tracks.

DSD 106 also includes volatile memory 140 that can, for example, include a Dynamic Random Access Memory (DRAM). In other embodiments, DSD 106 may not include volatile memory 140. In such embodiments, data stored in volatile memory 140 may instead be stored in SCM 128 for quick access.

Data stored in volatile memory 140 can include data read from NVM media (e.g., disk 150, NVRAM 122, or SCM 128) or data to be written to NVM media. In this regard, volatile memory 140 can include a write buffer and a read buffer for temporarily storing data.

As shown in FIG. 1, volatile memory 140 stores firmware 10, write table 12, and mapping systems 14. As discussed in more detail below with reference to FIG. 2, write table 12 can include information concerning data that has been stored in an NVM of DSD 106. Such information can include, for example, a logical address for the data that was specified by a write command, a write count or number of previously received write commands for the address, a frequency the address has been written, or a priority for the data or the write command indicating the address. As discussed in more detail below, a priority of the write command or a number of previously received write commands indicating the address can be used to select at least one of SCM 128 and NVRAM 122 for storing data to make better use of SCM 128.

Mapping systems 14 map logical addresses used by host 101 to identify data to device addresses indicating one or more locations in a memory of DSD 106 (e.g., SCM 128, NVRAM 122, or disk 150) where the data is stored. In other embodiments, one or more of NVRAM 122, SCM 128, or disk 150 may store their own mapping system with or without a copy of the mapping system stored in volatile memory 140.

The mapping systems can have different granularities corresponding to the addressability of the memory or the smallest writable unit of the memory. In one example, SCM 128 may provide for a more granular addressability with each byte of data having its own logical address in the mapping system. In contrast, the mapping system for disk 150 can have a different granularity corresponding to a sector size on disk 150 for 4 KB, and the mapping system for NVRAM 122 can have yet another granularity corresponding to a 512 byte page size. The different storage media can provide different tiers of granularity in their mappings. In one implementation, SCM 128, NVRAM 122, or disk 150 can be selected for storing data based on the size of the data to best fit within the granularity of its mapping system.

Volatile memory 140 can also store instructions loaded from firmware 10 for execution by controller 120 or data used in executing firmware 10. In this regard, volatile memory 140 in FIG. 1 is shown as temporarily storing firmware 10 which can include instructions for execution by controller 120 to implement the storage processes discussed below. Firmware 10 may be stored in one of the non-volatile storage media shown in FIG. 1 such as NVRAM 122, disk 150, and/or SCM 128.

In operation, host 101 stores data in DSD 106 by sending a write command to DSD 106 specifying one or more logical addresses (e.g., Logical Block Addresses (LBAs)) associated with the data. Host interface 126 receives the write command and controller 120 determines a location in a memory of DSD 106 (e.g., SCM 128, NVRAM 122, or disk 150) for storing the data. Controller 120 updates mapping systems 14 in volatile memory 140 to map the logical addresses associated with the data to physical addresses of the memory location storing the data.

Host 101 retrieves data from DSD 106 by sending a read command specifying one or more logical addresses associated with the data to be retrieved from DSD 106. Host interface 126 receives the read command and controller 120 uses a mapping system to translate the logical addresses of the read command to the physical addresses indicating the location of the data. Controller 120 then reads the requested data from the memory location specified by the physical addresses and returns the read data to host 101 via interface 126. It should be noted that although a singular form of disk 150, SCM 128, NVRAM 122, and volatile memory 140 is shown in the example of FIG. 1, each can represent a plurality of devices of the same or similar storage media in certain embodiments, such as in a system with multiple tiers of storage devices.

Figures 2, 3:
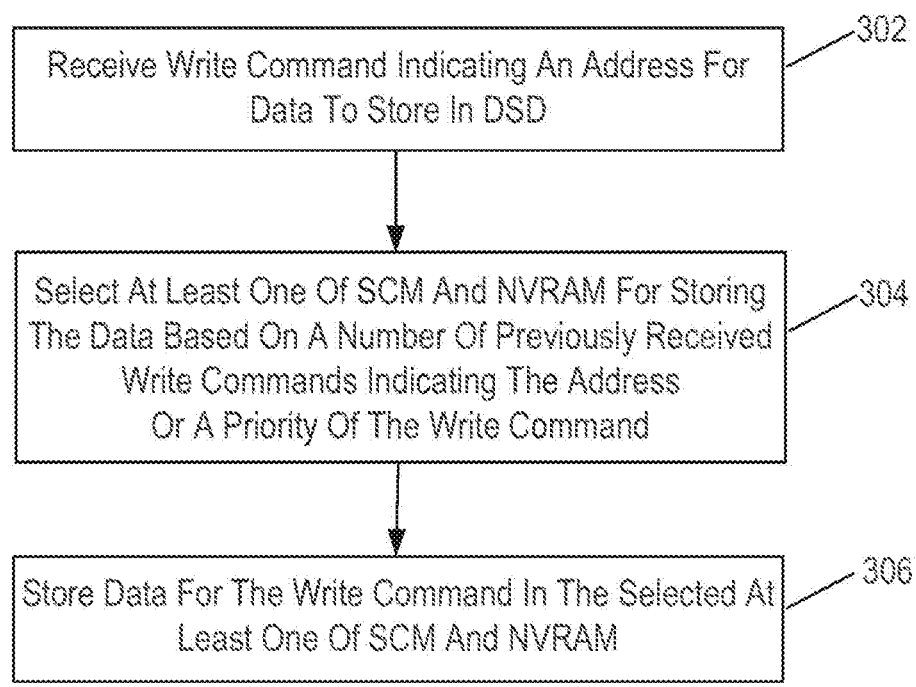
FIG. 2 depicts an example of a write table according to an embodiment.
FIG. 3 is a flowchart for a memory selection process according to an embodiment.

FIG. 2 depicts an example of write table 12 according to an embodiment. Other embodiments may include write table 12 as part of a different data structure or may include different information than that shown in FIG. 2.

In the example of FIG. 2, write table 12 includes information concerning data that has been stored in a memory of DSD 106 as a result of a write command received from host 101. A logical address is provided for the data. The logical address (e.g., LBA) can be used by host 101 to identify the data.

A write count provides a number of previously received write commands for the address. This information can be used to select whether to store the data for the write command in SCM 128, NVRAM 122, or disk 150. In one implementation where NVRAM 122 includes a flash memory, the data for a write command is directed to SCM 128 if the write count for its address exceeds a threshold value (e.g., three writes) to reduce wear on NVRAM 122. In this regard, NVRAM 122 may have a limited number of Program/Erase (P/E) cycles where a particular block of NVRAM 122 can be rewritten before it is no longer able to reliably store data. SCM 128, on the other hand, may have a greater usable life for repeatedly storing data for the same address. In one example, SCM 128 can include an MRAM that can allow for repeatedly writing data to the same location and still reliably storing data in the location.

Write table 12 in FIG. 2 also includes a frequency, which can indicate a number of times that data has been written for the address within a predetermined period of time such as within the past minute. The frequency for an address can be compared to a threshold frequency in determining whether to store data for the address in SCM 128 or NVRAM 122. By storing data for addresses that are more frequently written in a memory that can be accessed quicker, it is ordinarily possible to improve the performance of DSD 106 in accessing data. In one implementation, SCM 128 can include a memory such as, for example, MRAM or 3D XPoint memory, that can be written to quicker than a flash memory.

In addition, storing data for frequently written addresses can also reduce power usage if NVRAM 122 requires more power to store data than SCM 128. These power and access performance benefits can also apply to data that would otherwise be stored on disk 150 by redirecting the storage of such data from disk 150 to SCM 128.

In other implementations, write table 12 or another data structure may indicate a number of read commands received to access data associated with a particular address or a read frequency for the address. Although the time differences between reading data from a flash memory and most SCM are not as great as the time differences between writing data in a flash memory and most SCM, a shorter time to read data from SCM 128 than from NVRAM 122 can allow for a performance advantage by storing more frequently read addresses in SCM 128.

In FIG. 2, write table 12 also includes information indicating a priority for the address. The priority can indicate a priority of a write command received from host 101 when storing data for the address or a priority associated with the address. In the example of FIG. 2, a higher number for priority can indicate a higher priority for the last write command received for that address. For example, a high priority write command can include one or more of a Forced Unit Access (FUA) write command, a Write Cache Disable (WCD) write command, a write command to store boot data for initializing host 101, a write command to store state data of DSD 106 or host 101, or a write command to store state data of DSD 106 or host 101 after an unexpected power loss. In the example of FIG. 2, different types of high priority write commands are indicated using different values in write table 12. In other embodiments, all high priority write commands can be indicated with a single value (e.g., 1).

In the case of an FUA or WCD command, storing the data for the write command quickly in SCM 128 can allow DSD 106 to report completion of the write command sooner than if the data was stored with more latency in NVRAM 122 or disk 150. By reporting completion of these types of commands sooner, it is ordinarily possible to improve an overall performance of host 101 and DSD 106 since host 101 may need to wait for DSD 106 to report completion of a FUA or WCD command before initiating other commands.

In the case of a command to store boot data of host 101 or DSD 106, the boot data can be accessed quicker from SCM 128 than from NVRAM 122 or disk 150. This can provide for a shorter startup time or resume time for host 101 or DSD 106. Boot data may include, for example, register settings for controller 120 or execution code that might otherwise be stored in NVRAM 122 or disk 150. In some implementations, boot data may be stored in both SCM 128 and in another memory such as NVRAM 122 or disk 150 to provide for redundancy in case one copy of the boot data becomes unavailable or corrupted. The boot data may only be stored to disk 150 during a shutdown process of DSD 106 and later deleted or migrated to volatile memory 140 or another memory following a startup period to free space in SCM 128.

In the case of a command to store state data (e.g., metadata) of DSD 106 or host 101, changes in a state of DSD 106 or host 101 can be quickly stored in SCM 128. In addition, by non-volatilely storing state data in SCM 128, a startup or resume time can ordinarily be decreased since such state data does not need to be reconstructed in a volatile memory such as volatile memory 140 after starting up or resuming.

In the case of a command to store state data of DSD 106 or host 101 after an unexpected power loss, SCM 128 can be used to quickly store data that may otherwise be stored in volatile memory 140 or other data that may be lost if not quickly stored in NVM. A quicker storage of state data and/or a lower power used to store data can allow SCM 128 to be used to store more data or metadata after an unexpected power loss. The data or metadata can be quickly migrated or egressed from volatile memory 140 or from another volatile memory, such as a read or write channel of controller 120, to SCM 128.

In addition to being used to select a memory for storing data from a write command, write table 12 can also be used to determine which data should be migrated into or out of SCM 128. An example of such migration is discussed below with reference to the migration process of FIG. 5.

Memory Selection Examples

FIG. 3 is a flowchart for a memory selection process that can be performed by controller 120 executing firmware 10 according to an embodiment. In block 302, controller 120 receives a write command indicating an address for data to store in DSD 106. The address can indicate a logical address that is used by host 101 to identify the data to be stored.

In block 304, controller 120 selects at least one of SCM 128 and NVRAM 122 for storing the data based on a number of previously received write commands indicating the address or a priority of the write command or a priority of the write command. Storing data for high priority commands in SCM 128 can allow for a quicker completion time of the command or may provide for redundancy if the data is also stored in another location. Such high priority commands can include, for example, an FUA write command, a WCD write command, a write command to store boot data, or a write command to store a state of DSD 106 or host 101 after an unexpected power loss.

With respect to the number of previously received write commands for the address, controller 120 may use write table 12 to determine the number of previously received write commands for the address and compare the number to a threshold value. If the number of previously received write commands exceeds the threshold value, SCM 128 can be selected for storing the data. On the other hand, if the number of previously received write commands does not exceed the threshold value, NVRAM 122 or disk 150 can be selected for storing the data.

A frequency of write commands for an address in write table 12 may alternatively or additionally be used to determine whether to store the data in SCM 128. Controller 120 may compare the number of previously received write commands indicating the address for a predetermined period of time (e.g., within 60 seconds) to a threshold frequency. If the frequency of previously received write commands exceeds the threshold frequency, the data can be stored in SCM 128.

As noted above with reference to FIG. 2, storing data for more frequently written addresses in SCM 128 can ordinarily reduce the wear on NVRAM 122 or the risk of data corruption in portions of disk 150 that may, for example, be susceptible to Wide Area Track Erasure (WATER) or Adjacent Track Interference (ATI). In addition, storing data for frequently written addresses in SCM 128 can also improve the performance of DSD 106 in reducing the amount of time it takes DSD 106 to store data. However, since the storage capacity of SCM 128 may be limited, data for addresses that are not as frequently written or for lower priority write commands can be stored in NVRAM 122 to save space in SCM 128.

In block 306, controller 120 stores data for the write command in the selected memory or memories.

Figure 4:
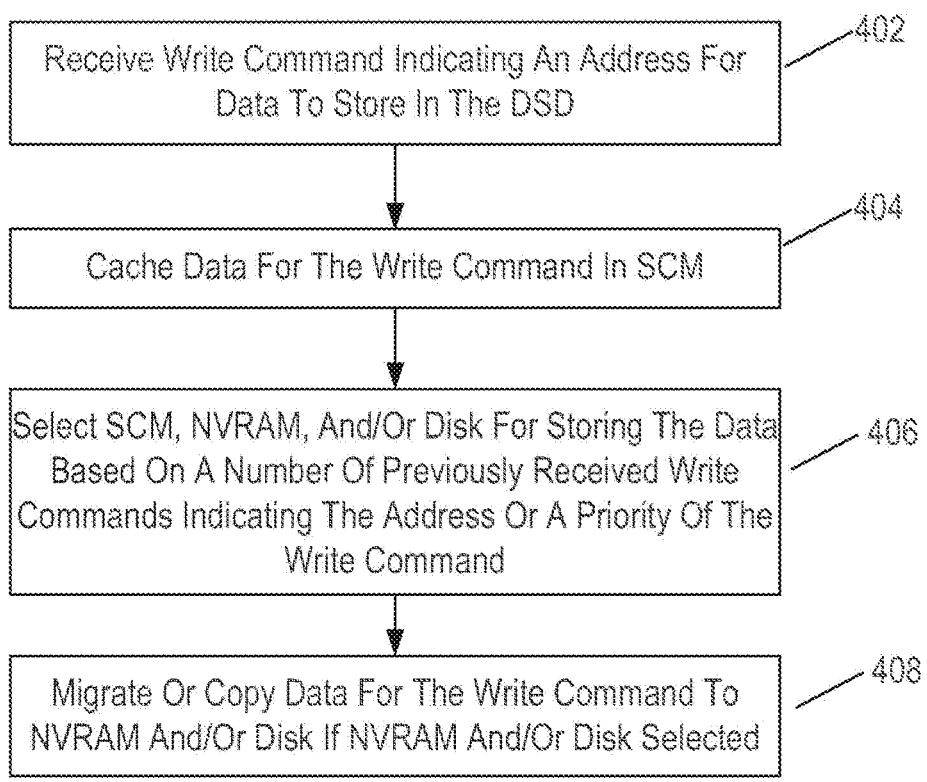
FIG. 4 is a flowchart for a write caching process according to an embodiment.

FIG. 4 is a flowchart for a write caching process that can be performed by controller 120 executing firmware 10 according to an embodiment. The caching process of FIG. 4 is similar to the memory selection process of FIG. 3, except that the data received for the write command can be first cached or temporarily stored in SCM 128 before writing the data to its selected location. In this regard, SCM 128 can serve as a power safe, write-through cache where data is first quickly written before being stored in NVRAM 122 or disk 150.

In block 402, controller 120 receives a write command indicating an address for data to store in DSD 106. In block 404, controller 120 caches the data for the write command in SCM 128. By caching the data in SCM 128, the data can ordinarily be quickly stored and later migrated or copied to another NVM if needed. In the case of data for a WCD or FUA command, non-volatilely storing such data in SCM 128 can allow DSD 106 to quickly report completion of the command and can improve system performance.

In addition, temporarily storing or caching data in SCM 128 that is to be later stored in NVRAM 122 or disk 150 can allow for a more efficient performance by deferring the performance of such writes to when there is less activity. In some cases, temporarily storing data for a write command in SCM 128 can also allow for the grouping of data for a sequential writing or the writing of a particular amount of data to NVRAM 122 or disk 150 to meet a page size or sector size.

The data for the write commands can be queued in SCM 128, and queuing algorithms for NVRAM 122 or disk 150 can be used to reorder the performance of the commands to improve efficiency in performing the commands. When the data is eventually written in NVRAM 122 or disk 150, the data can be sequentially written as a stream of data. In one example, a Rotational Position Optimization (RPO) algorithm can be used to reorder deferred write commands for disk 150 to reduce an overall distance that head 136 would need to travel in performing the write commands. The data for the write commands for NVRAM 122 and disk 150 can be kept in separate queues.

In addition, SCM 128 can be used to store data for out of order or random commands that would otherwise make a series of sequentially addressed commands non-sequential. For example, a first and a third write command may be addressed such that their data can be stored in the same region of NVRAM 122 or disk 150, but a second intervening command may be out of order by having an address that would require storing the data for the second write command outside of the region. In such a case, the second command can be temporarily stored in SCM 128 so that the first and third commands can be sequentially written in the region to improve efficiency in performing the write commands.

Some implementations may also consider the size of an out of order write command in determining which memory to use. In one example, out of order or random write commands for data larger than a predetermined size can be stored in NVRAM 122 instead of SCM 128 to save space in SCM 128. Out of order write commands larger than a second predetermined size can be stored on disk 150 to save space in NVRAM 122.

With reference to FIG. 4, controller 120 in block 406 selects NVRAM 122, disk 150, and/or SCM 128 for storing the data based on a number of previously received write commands indicating the address or a priority of the write command. If NVRAM 122 or disk 150 is selected, controller 120 in block 408 migrates the cached data from SCM 128 to NVRAM 122 or disk 150. In the case where SCM 128 is one of or the only selected memory, the cached data may remain in its storage location in SCM 128 without needing to be rewritten in SCM 128.

Figure 5:
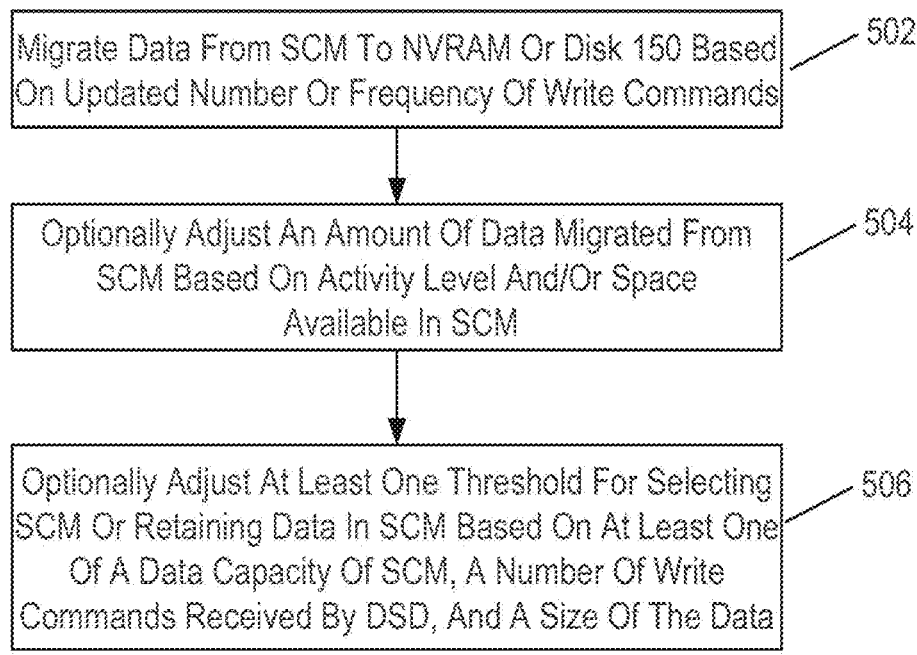
FIG. 5 is a flowchart for a data migration process according to an embodiment.

FIG. 5 is a flowchart for a data migration process that can be performed by controller 120 executing firmware 10 according to an embodiment. The process of FIG. 5 may, for example, be performed periodically to conserve space in SCM 128, during periods of low activity, or in response to SCM 128 reaching a threshold level of data stored in SCM 128.

In block 502, controller 120 migrates data from SCM 128 to NVRAM 122 or disk 150 based on an updated number of previously received write commands or an updated frequency of previously received write commands. In one implementation, if the number of write commands for certain addresses exceeds a threshold number of commands, controller 120 determines that data for less frequently written addresses that are stored in SCM 128 should be migrated to NVRAM 122 or disk 150 to make room for data of more frequently written addresses. In another implementation, the frequency information for addresses in write table 12 may be compared to a threshold frequency to determine if any of the data should be migrated from SCM 128 to NVRAM 122 or disk 150 in light of an updated write frequency.

In block 504, controller 120 optionally adjusts an amount of data that is migrated from SCM 128 based on at least one of an activity level of storing data in SCM 128 and a remaining storage capacity available in SCM 128. In one example, if the available storage space remaining in SCM 128 has reached a low level, controller 120 increases the amount of data migrated from SCM 128 to make more space available.

Controller 120 may migrate a certain amount of the least recently accessed data from SCM 128 using information from write table 12. In some embodiments, controller 120 can prioritize certain data in determining which data should remain in SCM 128. In one implementation, metadata is assigned a highest priority for being kept in SCM 128 due to its generally smaller size and frequency of being rewritten. Data that has been transferred into SCM 128 from a volatile memory (e.g., volatile memory 140) can be assigned a second highest priority for being kept in SCM 128 for data protection purposes. Data for frequently written addresses can be assigned a next highest priority to take greater advantage of a faster write time and/or a better endurance of SCM 128. Other implementations can use different criteria for determining which data should be kept in SCM 128.

Controller 120 may use the frequency information of write table 12 or other information indicating how much data has been stored in SCM 128 within a recent period of time to determine an activity level. In other implementations, the activity level can be determined based on whether DSD 106 has become idle or has not received any write commands from host 101 within a predetermined period of time.

For example, if DSD 106 has not received any write commands from host 101 within a predetermined period of time, controller 120 may determine that there is a low activity level for storing data in SCM 128 or DSD 106. In such a case, controller 120 may take advantage of additional resources available during the period of low activity to increase the amount of data migrated from SCM 128.

In block 506, controller 120 optionally adjusts at least one threshold for selecting SCM 128 for storing or retaining data in SCM 128 based on at least one of a data capacity of SCM 128, a number of write commands received by DSD 106, and a size of data received from host 101.

In one example, controller 120 increases a threshold number of previous write commands required to select SCM 128 for storing or retaining data when the remaining available data capacity for SCM 128 falls below a low storage threshold. This adjustment can be performed to conserve space in SCM 128 as it approaches a full storage capacity. The threshold number of previous write commands can later be adjusted back down when more data has been migrated or deleted from SCM 128.

In another example, controller 120 increases the threshold number of write commands required for SCM 128 if there are more than a predetermined number of write commands received within a period of time. On the other hand, controller 120 can decrease the threshold number of write commands if there have been less than the predetermined number of write commands to allow for more data to be stored in SCM 128.

In yet another example, the threshold number of write commands may be adjusted based on the size of the data being considered for storage or retention in SCM 128. For example, data larger than a predetermined size may need a higher number of write counts to remain in or be stored in SCM 128.

Memory Access Examples

Figure 6:
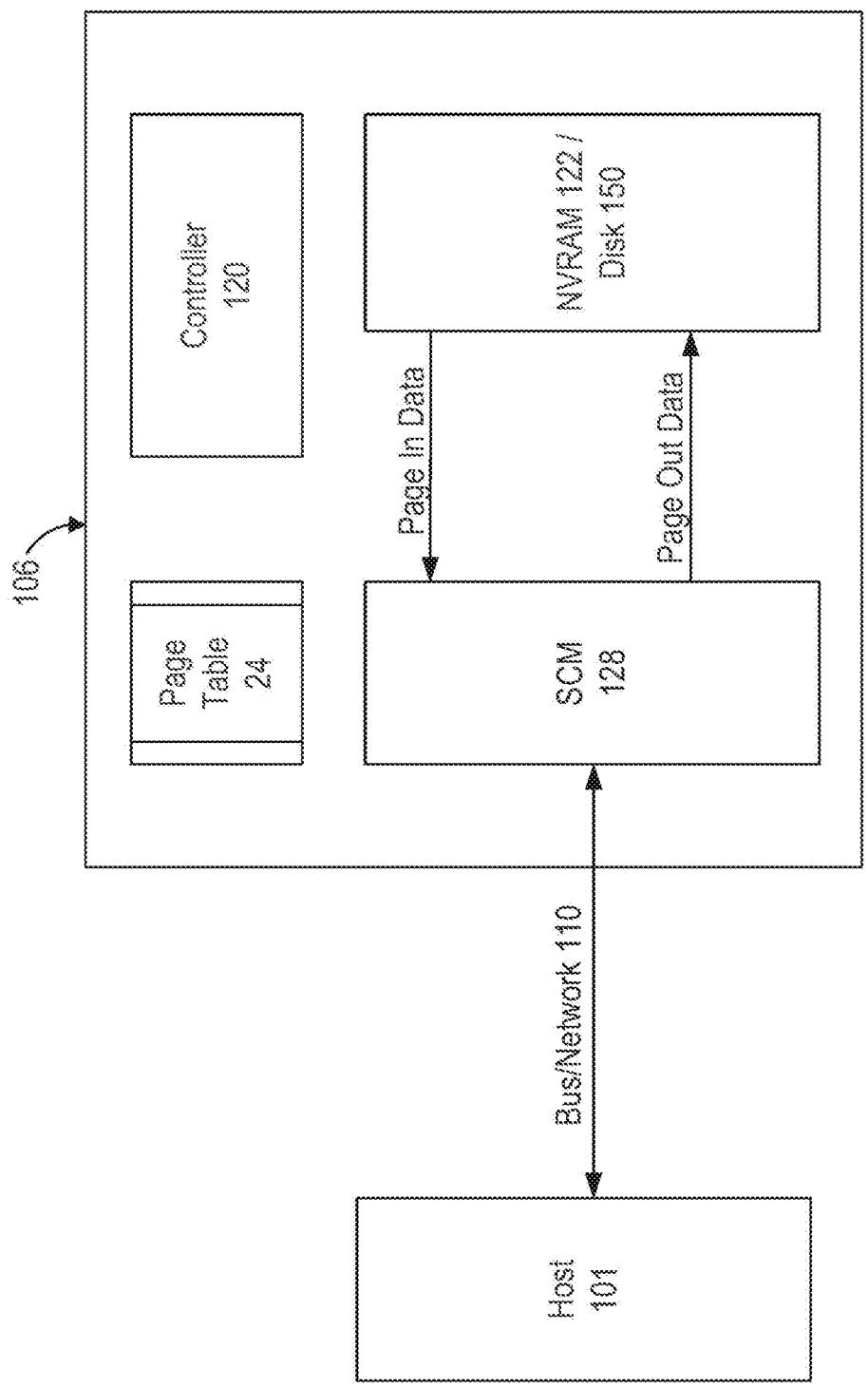
FIG. 6 is a block diagram showing direct memory access of a Storage Class Memory (SCM) by a host according to an embodiment.

FIG. 6 is a block diagram showing direct memory access of SCM 128 by host 101 according to an embodiment. In the example of FIG. 6, DSD 106 allocates at least a portion of SCM 128 for use by host 101 and also maps logical addresses assigned to SCM 128 to device addresses of NVRAM 122 and/or disk 150 that identify locations for storing data in NVRAM 122 and/or disk 150. The allocated address space of SCM 128 can allow for read and write access to SCM 128, NVRAM 122, and/or disk 150 by host 101 using the logical addresses of SCM 128. DSD 106 can provide host 101 with an indication of the logical addresses assigned to SCM 128 to allow host 101 to retrieve data from and store data in DSD 106 using the logical addresses assigned to SCM 128.

The foregoing arrangement can ordinarily allow host 101 to access NVM of DSD 106 (e.g., SCM 128, NVRAM 122, and disk 150) without a conventional storage interface such as SCSI or SATA and its associated overhead latency. In some implementations, bus/network 110 may include, for example, a PCIe bus or other type of fast memory bus.

In addition, the logical addresses assigned to SCM 128 can be addressable at a smaller size (e.g., at the byte level) than the size otherwise used for NVRAM 122 or disk 150. This can ordinarily allow for a more granular reading and writing of data that can provide for more efficient read and write access. In one embodiment, host 101 may represent a CPU and the address space of DSD 106 may be made available with a direct memory access protocol.

DSD 106 can receive write commands or read commands from host 101 at a granularity of a mapping system for SCM 128. A portion of the logical addresses assigned to SCM 128 can map to other memories such as NVRAM 122 or disk 150. In one example, a 4 GB address space may be assigned to SCM 128 but only 2 GB of the address space may actually map to device addresses in SCM 128. The remaining 2 GB of address space can map to device addresses in NVRAM 122 and/or disk 150. The faster write and/or read access of SCM 128 and its greater endurance for storing data can allow SCM 128 to serve as a read cache for data requested by host 101 and a write cache for data written by host 101.

In addition, DSD 106 may provide thin provisioning with SCM 128 by reporting more storage space to host 101 than DSD 106 actually has. In one example, DSD 106 may report the address range of SCM 128 as including 2 TB of storage space, but SCM 128 may only have 1 GB of storage space and NVRAM 122 and disk 150 may only have 100 GB of storage space. This can allow host 101 to store data anywhere in the 2 TB address space despite the size of the actual storage capacity. Data can be initially stored in SCM 128 and migrated to NVRAM 122 or disk 150 for consolidation as SCM 128 reaches its storage capacity. Once SCM 128, NVRAM 122, and disk 150 reach a threshold storage capacity, additional storage can be added to DSD 106 in the field (e.g., hot add memory).

Although FIG. 6 shows one host (i.e., host 101) and one DSD (i.e., DSD 106), other embodiments can include multiple hosts sharing DSD 106, each with direct memory access to SCM 128 via bus/network 110. The sharing of SCM among multiple hosts can ordinarily provide a more efficient use of SCM than dedicating SCM to a single host due to varying memory needs from one host to another. In yet other embodiments, FIG. 6 can include multiple DSDs, each having its SCM shared by one or more hosts.

When a read command is received from host 101 for data that is stored in NVRAM 122 or disk 150, the requested data is copied into SCM 128 and sent to host 101 from SCM 128. When a write command is received from host 101 to store data in NVRAM 122 or disk 150, the data is cached in SCM 128 and migrated to NVRAM 122 or disk 150. The migration of data to NVRAM 122 or disk 150 can occur after the data meets a particular page size or sector size (e.g., 512 bytes or 4 KB) for storing the data in NVRAM 122 or disk 150. In this way, it is ordinarily possible for host 101 to have access of data stored in DSD 106 at a more granular level than may otherwise be available without SCM 128.

Page table 24 can be used to keep track of the data that is stored in SCM 128 at a given time. Page table 24 can also be used in arranging the data into a page or sector size that is to be stored in NVRAM 122 or in disk 150.

In some implementations, DSD 106 can provide host 101 with access to page table 24. In such an implementation, host 101 can indicate certain addresses for data or metadata that should be kept for persistent storage in SCM 128 and not flushed or migrated to NVRAM 122 or disk 150. Such data or metadata might include boot data, host operating system data, system information, hibernate information, or other state information of host 101.

The data or metadata stored in SCM 128 may not need to be separately saved to a file system. In some implementations, the memory allocation for SCM 128 is native to an operating system of host 101. Host 101 can then access the data with addresses allocated to SCM 128 using a native mapping routine with an operating system of host 101, rather than using a file system based on metadata.

In one example, SCM 128 can be used as an extension of a CPU cache of host 101 so that SCM 128 is used when lower levels of a CPU cache (e.g., L1 and L2) are full at host 101. This can ordinarily provide better processing performance for host 101.

In addition, host 101 can access data and metadata stored in SCM 128 without having to fully power other memories such as spinning disk 150 up to an operating speed, which can save power and time in accessing data or metadata. In one example, a directory structure for disk 150 can be stored in SCM 128 so that host 101 can access the directory structure of disk 150 without having to spin up disk 150.

In some embodiments, host 101 can provide DSD 106 with hinting as to which user data should be stored in SCM 128 or evicted from SCM 128. This can be done using an address inference where different designated ranges of addresses would have a different priority associated with the range. As with FIG. 1, it should be noted that although a singular form of SCM 128, NVRAM 122, and disk 150 is shown in the example of FIG. 6, each can represent a plurality of devices of the same or similar storage media in certain embodiments, such as in a system with multiple tiers of storage devices.

Figure 7:
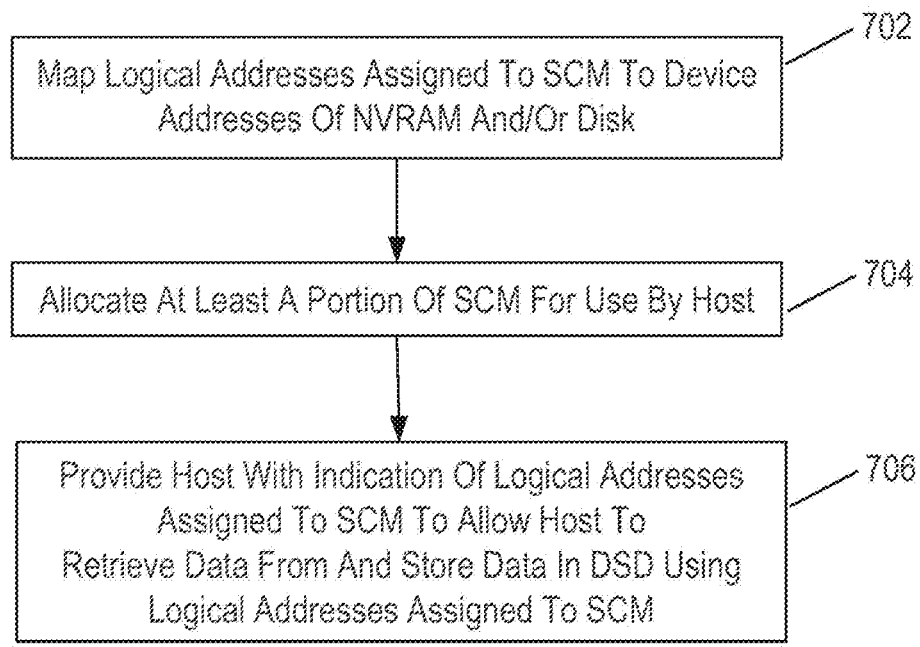
FIG. 7 is a flowchart for a memory allocation process according to an embodiment.

FIG. 7 is a flowchart for a memory allocation process that can be performed by controller 120 executing firmware 10 according to an embodiment. In block 702, controller 120 maps logical addresses assigned to SCM 128 to device addresses of NVRAM 122 and/or disk 150.

In block 704, controller 120 allocates at least a portion of SCM 128 for use by host 101. In some implementations, all of SCM 128 may be allocated to host 101. In other implementations, portions of SCM 128 may be reserved for overprovisioning or for storing system data used by DSD 106. In one example, a portion of SCM 128 may be used as a scratch space for temporarily storing valid data that has been garbage collected from NVRAM 122 or disk 150. Controller 120 may perform a garbage collection process to reclaim obsolete portions of a region in NVRAM 122 or disk 150 that store invalid data. As part of the garbage collection process, valid data can be copied to a reserved portion of SCM 128 from the valid portions of the region being garbage collected. For example, in an SMR zone storage application, the zones' number of valid LBAs may be evaluated. Zones that have a larger amount of valid data may be garbage collected to another zone, but zones that have only a small amount of valid data may have the valid data copied to SCM 128. This can provide performance improvement especially in the case where many zones each contain a small amount of valid data, as data can be read and written quickly into SCM 128, and all such zones can be made available for re-writing without incurring the mechanical latency associated with a disk write to another zone. The same principle can be applied to other systems such as a media based cache or an NVRAM type memory (e.g., implementing a flash translation layer) where garbage collection is needed.

In block 706, controller 120 provides host 101 with an indication of logical addresses assigned to SCM 128 to allow host 101 to retrieve data from and store data in DSD 106 using the logical addresses assigned to SCM 128. As discussed above with reference to FIG. 6, this can allow host 101 to directly access SCM 128 using the address space of SCM 128. The address space of SCM 128 can also provide host 101 with access to NVRAM 122 and disk 150 at a more granular level than a page or sector size corresponding to a smallest writable unit of NVRAM 122 or disk 150.

Figure 8:
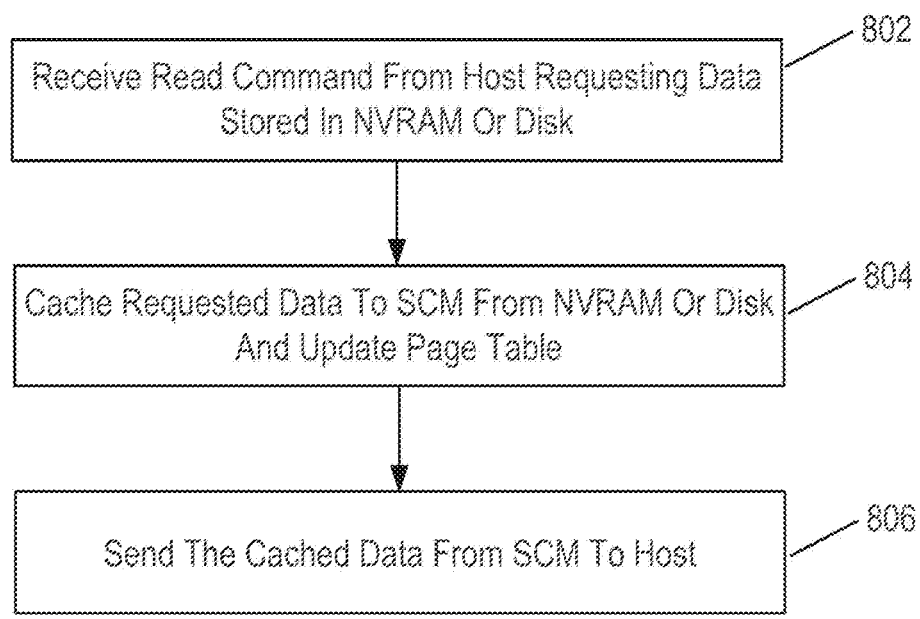
FIG. 8 is a flowchart for a read process according to an embodiment.

FIG. 8 is a flowchart for a read process that can be performed by controller 120 executing firmware 10 according to an embodiment where SCM 128 is used as a read cache.

In block 802, controller 120 receives a read command from host 101 requesting data stored in NVRAM 122 or disk 150. The read command can indicate a logical address assigned to SCM 128 that is mapped to a device address of NVRAM 122 or disk 150. Controller 120 may check or compare the logical address using page table 24 to determine if the data is already cached in SCM 128 or stored in NVRAM or disk 150.

In block 804, controller 120 reads the requested data from the device address corresponding to the logical address indicated by the read command, and the read data is cached in SCM 128 from NVRAM 122 or disk 150. Controller 120 may use a mapping system of mapping systems 14 that maps the logical addresses of SCM 128 to device addresses of NVRAM 122 or disk 150. Page table 24 is also updated to account for the data cached in SCM 128.

In block 806, controller 120 sends the copied data from SCM 128 to host 101. The data cached in SCM 128 may remain in SCM 128 or may be deleted after sending the data to host 101. Controller 120 may, for example, determine whether to retain the cached data based on a remaining available capacity of SCM 128 and/or a frequency of access for the requested data.

Figure 9:
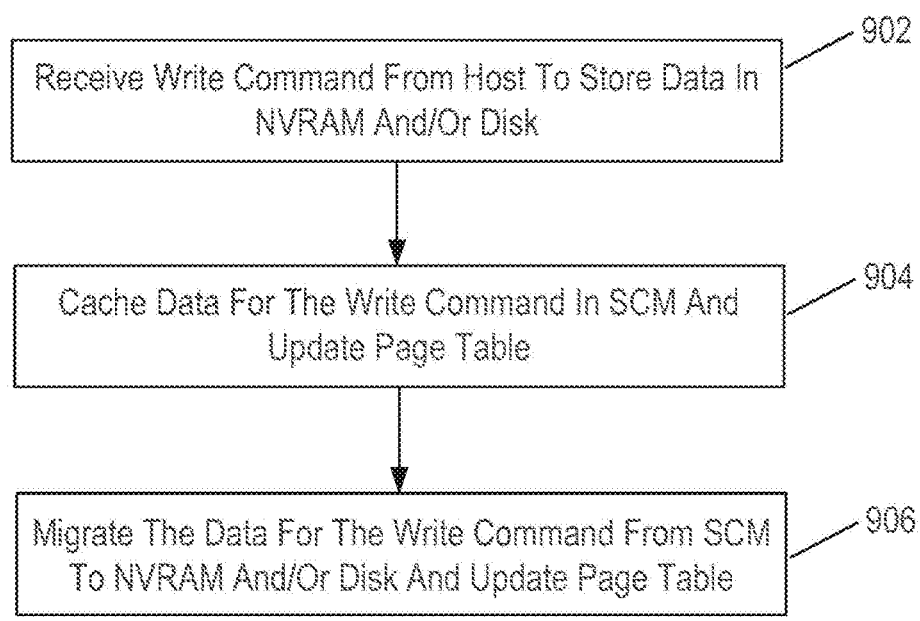
FIG. 9 is a flowchart for a write process according to an embodiment.

FIG. 9 is a flowchart for a write process that can be performed by controller 120 executing firmware 10 according to an embodiment where SCM 128 is used as a write cache.

In block 902, DSD 106 receives a write command from host 101 to store data in NVRAM 122 and/or disk 150. The write command can indicate a logical address assigned to SCM 128 that is mapped to a device address in NVRAM 122 and/or disk 150.

In block 904, the data for the write command is cached in SCM 128. By caching the data in SCM 128, it is ordinarily possible to quickly store the data for the write command in non-volatile memory since SCM 128 can be written to quicker than NVRAM 122 or disk 150. In some implementations, a notification that the write command has been completed can be sent to host 101 upon caching the data in SCM 128. This can ordinarily improve a performance of DSD 106 or host 101 since host 101 may then be allowed to proceed with other commands that may have been dependent upon the completion of the write command. This can be especially helpful for WCD commands and FUA commands where DSD 106 may be required to wait until the data for the command has been stored in NVM before reporting completion of the command to host 101.

In block 906, the data cached in SCM 128 is migrated from SCM 128 to its intended location or locations in NVRAM 122 and/or disk 150. Using SCM 128 as a write cache can allow for the migration of data to its intended location or locations to occur when it is more efficient such as during a period of low activity of DSD 106 or when there are other commands being performed in close proximity to the intended location or locations in NVRAM 122 and/or disk 150. Controller 120 in block 906 also updates page table 24 to indicate that the data for the write command has been migrated or paged out of SCM 128.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A Data Storage Device (DSD), comprising:
a first memory for storing data;
a Storage Class Memory (SCM) for storing data, the SCM having at least one characteristic of being faster than the first memory in storing data, using less power to store data than the first memory, and providing a greater usable life than the first memory for repeatedly storing data in a same memory location; and
a controller configured to:
  allocate at least a portion of the SCM for use by a host;
  map logical addresses assigned to the SCM to device addresses of the first memory identifying locations for storing data in the first memory;

provide the host with an indication of the logical addresses assigned to the SCM to allow the host to retrieve data from and store data in the DSD using the logical addresses assigned to the SCM;

use a first mapping system for mapping logical addresses of data stored in the first memory to device addresses of the first memory and a second mapping system for mapping logical addresses of data stored in the SCM to device addresses of the SCM, wherein the second mapping system is more granular than the first mapping system;

receive one or more write commands from the host to store data in the DSD; and select the first memory or the SCM for storing the data for the one or more write commands based on a size of the data with respect to the granularity of the first mapping system and the granularity of the second mapping system.

2. The DSD of claim 1, wherein the first memory includes at least one of a rotating magnetic disk and a Non-Volatile Random Access Memory (NVRAM).

3. The DSD of claim 1, wherein the controller is further configured to:

receive a read command from the host requesting data stored in the first memory;

cache the requested data from the first memory to the SCM; and send the cached data from the SCM to the host.

4. The DSD of claim 1, wherein the controller is further configured to:

cache the data for the one or more write commands in the SCM; and migrate the data for the one or more write commands from the SCM to the first memory.

5. The DSD of claim 1, wherein a memory allocation for the SCM is native to an operating system of the host to allow the host to access data with logical addresses allocated to the SCM without using a file system based on metadata.

6. The DSD of claim 1, wherein the controller is further configured to:

report an address range of the SCM to the host indicating a greater storage space than physically available in the SCM; and migrate data from the SCM to the first memory to conserve storage space in the SCM.

7. The DSD of claim 1, wherein the controller is further configured to receive an indication from the host of addresses for at least one of data and metadata to be kept for persistent storage in the SCM and not migrated to the first memory.

8. The DSD of claim 1, wherein the SCM is used by the host as an extension of a Central Processing Unit (CPU) cache of the host.

9. The DSD of claim 1, wherein the controller is further configured to:

perform a garbage collection process to reclaim obsolete portions of a region in the first memory, wherein the obsolete portions store invalid data; and as part of the garbage collection process, use at least a portion of the SCM as a scratch space for temporarily storing valid data that has been garbage collected from the first memory.

10. A method of operating a Data Storage Device (DSD) including a first memory for storing data and a Storage Class Memory (SCM) for storing data, the method comprising:

reserving at least a portion of the SCM for use by a host, the SCM having at least one characteristic of being faster than the first memory in storing data, using less power to store data than the first memory, and providing a greater usable life than the first memory for repeatedly storing data in a same memory location;

mapping logical addresses assigned to the SCM to device addresses of the first memory identifying locations for storing data in the first memory;

providing the host with an indication of the logical addresses assigned to the SCM to allow the host to directly access data stored in the DSD using the logical addresses assigned to the SCM;

using a first mapping system for mapping logical addresses of data stored in the first memory to device addresses of the first memory and a second mapping system for mapping logical addresses of data stored in the SCM to device addresses of the SCM, wherein the second mapping system is more granular than the first mapping system;

receiving one or more write commands from the host to store data in the DSD; and selecting the first memory or the SCM for storing the data for the one or more write commands based on a size of the data with respect to the granularity of the first mapping system and the granularity of the second mapping system.

11. The method of claim 10, further comprising:

receiving a read command from the host requesting data stored in the first memory;

caching the requested data from the first memory to the SCM; and sending the cached data from the SCM to the host.

12. The method of claim 10, further comprising:

caching the data for the one or more write commands in the SCM; and migrating the data for the one or more write commands from the SCM to the first memory.

13. The method of claim 10, wherein a memory allocation for the SCM is native to an operating system of the host to allow the host to access data with logical addresses allocated to the SCM without using a file system based on metadata.

14. The method of claim 10, further comprising:

reporting an address range of the SCM to the host indicating a greater storage space than physically available in the SCM; and migrating data from the SCM to the first memory to conserve storage space in the SCM.

15. The method of claim 10, further comprising receiving an indication from the host of addresses for at least one of data and metadata to be kept for persistent storage in the SCM and not migrated to the first memory.

16. The method of claim 10, wherein the SCM is used by the host as an extension of a Central Processing Unit (CPU) cache of the host.

17. The method of claim 10, further comprising:

performing a garbage collection process to reclaim obsolete portions of a region in the first memory, wherein the obsolete portions store invalid data; and as part of the garbage collection process, using at least a portion of the SCM as a scratch space for temporarily storing valid data that has been garbage collected from the first memory.

18. A Data Storage Device (DSD), comprising:

a first memory for storing data;

a Storage Class Memory (SCM) for storing data, the SCM having at least one characteristic of being faster than the first memory in storing data, using less power to store data than the first memory, and providing a greater usable life than the first memory for repeatedly storing data in a same memory location; and a controller configured to:
receive a write command to store data in the DSD, the write command indicating an address for the data and including at least one of a Forced Unit Access (FUA) write command, a Write Cache Disable (WCD) write command, a write command to store boot data for initializing a host in communication with the DSD, a write command to store state data of the DSD or the host, and a write command to store state data of the DSD or the host after an unexpected power loss; and select at least one of the first memory and the SCM for storing the data of the write command based on a priority of the write command.

19. The DSD of claim 18, wherein the first memory includes at least one of a rotating magnetic disk and a Non-Volatile Random Access Memory (NVRAM).

20. The DSD of claim 18, wherein the write command includes state data unrelated to boot data and an unexpected power loss.

21. The DSD of claim 18, wherein the controller is further configured to use a first mapping system for mapping logical addresses of data stored in the first memory to device addresses of the first memory and a second mapping system for mapping logical addresses of data stored in the SCM to device addresses of the SCM, and wherein the second mapping system is more granular than the first mapping system.

22. The DSD of claim 18, wherein the controller is further configured to:
perform a garbage collection process to reclaim obsolete portions of a region in the first memory, wherein the obsolete portions store invalid data; and
as part of the garbage collection process, use at least a portion of the SCM as a scratch space for temporarily storing valid data that has been garbage collected from the first memory.

* * * * *